Sept. 15, 1970     D. L. NEILL ET AL     3,529,292
REMOTELY CONTROLLED LOAD CONTROLLING AND PROTECTION SYSTEM
WITH SUPERVISION
Filed Oct. 31, 1966     3 Sheets-Sheet 1

INVENTORS
DANIEL L. NEILL
GORDON A. ROBERTS
THOMAS W. BUTLER

BY Sughrue, Rothwell, Mion, Zinn & Macpeak

ATTORNEYS

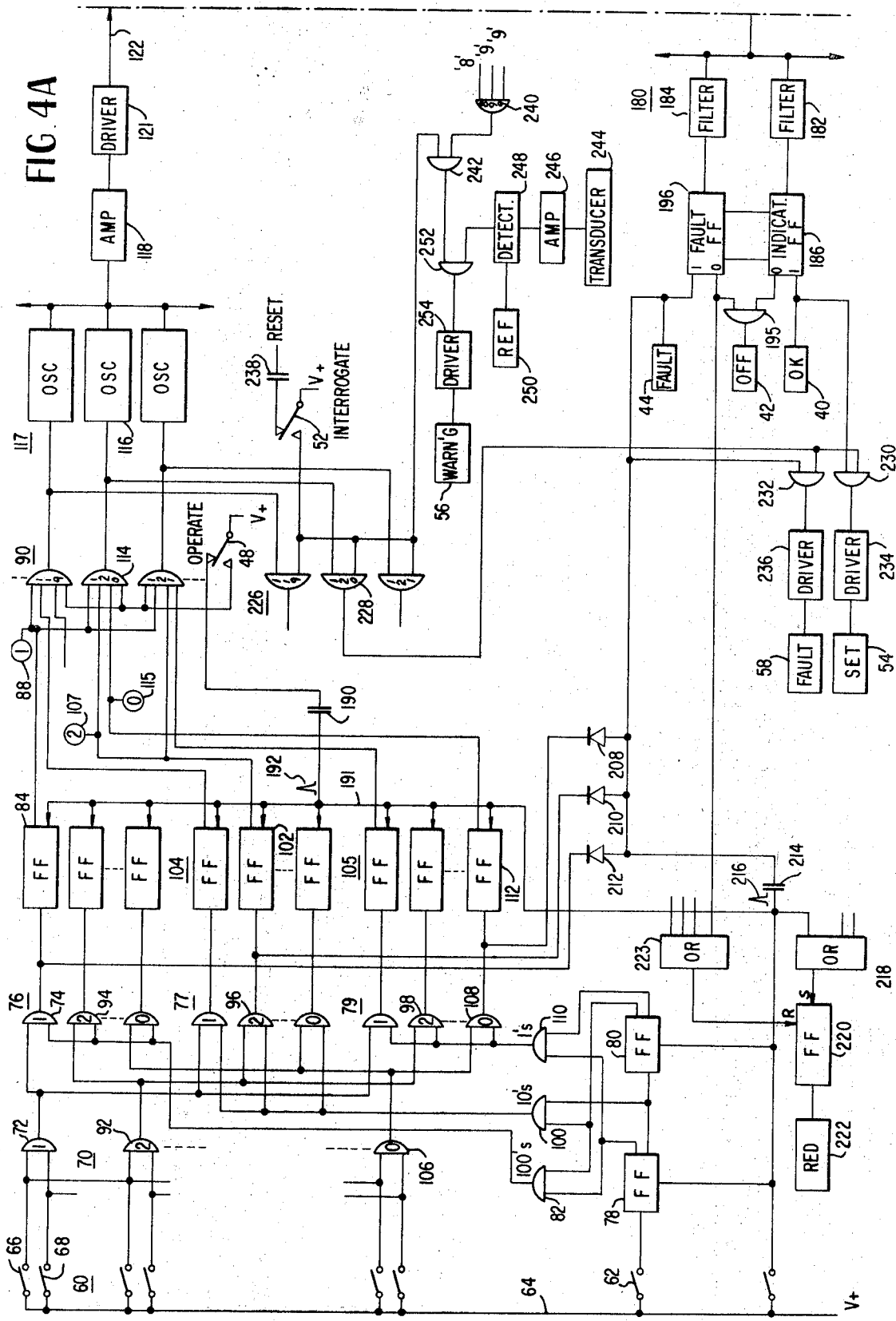

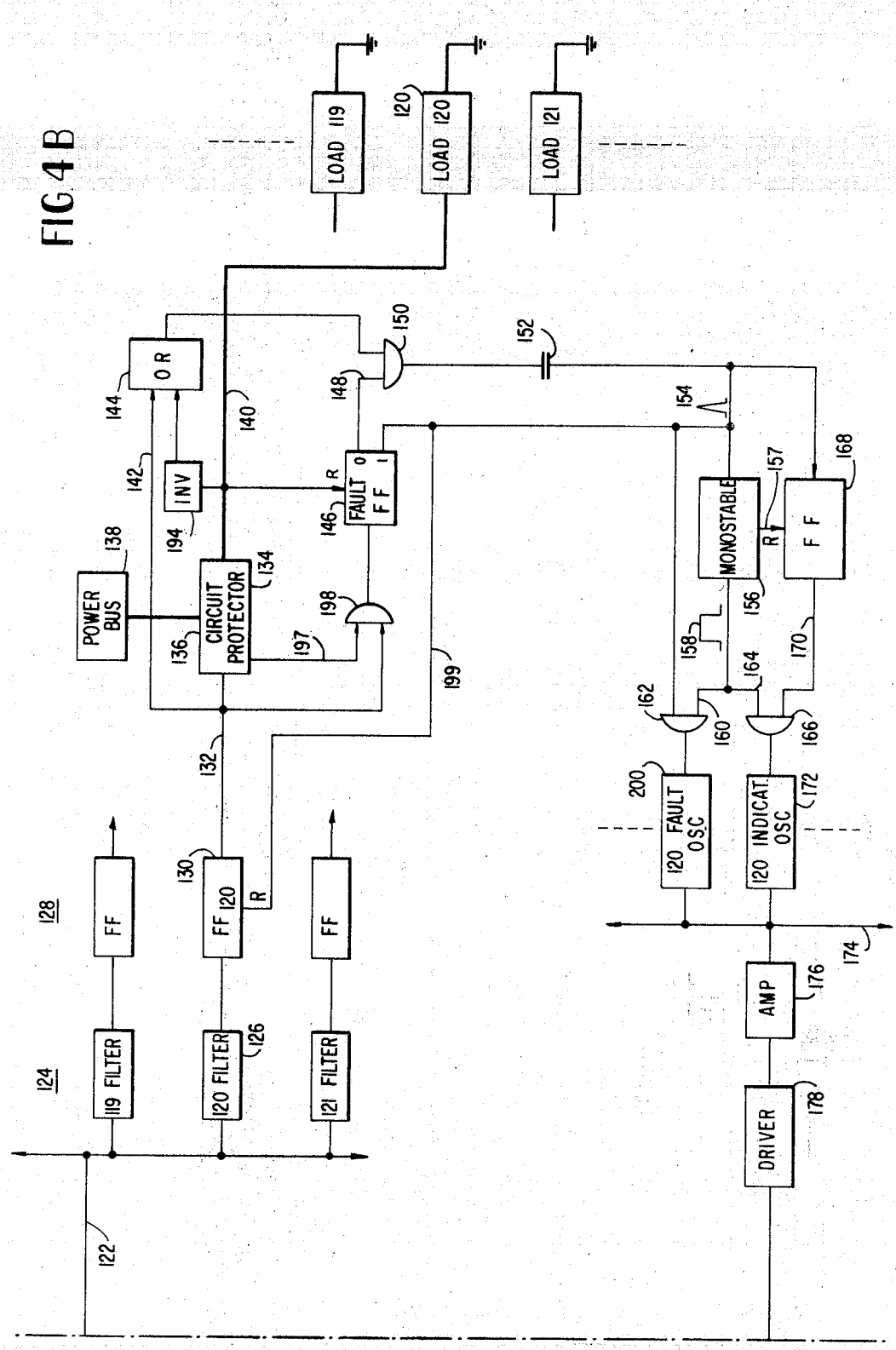

United States Patent Office 3,529,292
Patented Sept. 15, 1970

3,529,292
REMOTELY CONTROLLED LOAD CONTROLLING AND PROTECTION SYSTEM WITH SUPERVISION
Daniel L. Neill, Jackson, and Gordon A. Roberts and Thomas W. Butler, Ann Arbor, Mich., assignors to Howard Aiken Industries, Inc., Carlisle, Pa., a corporation of Delaware
Filed Oct. 31, 1966, Ser. No. 590,688
Int. Cl. G08b 26/00
U.S. Cl. 340—163    3 Claims

ABSTRACT OF THE DISCLOSURE

An improved supervisory and control system for controlling loads and displaying an indication of their condition on both a control panel and a supervisory panel. A ten digit tone selector selects a load for control or interrogation and a numerical identification of the selected load is displayed at the control panel on a digital display. Before a selected load is controlled or interrogated as to its condition, an erase button may be operated to de-select an improperly selected load. If a fault exists on a selected load, a red alarm lamp is illuminated behind the digital display which is displaying the load's numerical identification. The condition of each load is also continuously and simultaneously indicated on a separate supervisory panel.

---

This invention relates generally to load circuit protection systems and, more particularly, to an improved remotely controlled load controlling and protection system.

With the great increase in the number of load circuits in modern aircraft, there has arisen a need for an improved load circuit controlling and protection system compatible both with the space available in the aircraft and also with the switching and protection functions which such a system must provide.

In prior aircraft circuit breaker systems, the circuit breakers themselves were mounted behind a panel in the pilot's cabin easily within view of the pilot so he could determine the status of each breaker. However, many problems arise with such an arrangement when 1000 or more load circuits must be switched and protected. First, the size of the panel required to hold such a large number of circuit breakers would be too large to be quickly scanned by the pilot within the close confines of the pilot's cabin. Second, because of the limited space available in the pilot's cabin, the heat generated by the electrical currents flowing through the circuit breakers produces high temperatures which affect the operating characteristics of the circuit breakers. Third, placement of the circuit breakers in the pilot's cabin required a pair of heavy power conductors extending from the cabin to each remote load circuit.

Therefore, the broad object of the invention is to provide an improved remotely controlled load protection and controlling system responsive to the condition of selected load parameters. A fault is herein defined as an abnormal condition of one or more of these selected load parameters.

Another object is to provide a remotely controlled circuit breaker system which permits a great reduction in the weight of electrical conductors.

Another object is to provide a remotely controlled aircraft circuit breaker protection and controlling system which eliminates congestion in the pilot's cabin and permits both the control and supervision of a large number of load circuits.

Another object is to provide a remotely controllable circuit breaker system in which a single switch functions both as a load power switch and as a load interrupter or protector.

Another object is to provide a remotely controlled circuit breaker system having a control panel including a digital display for indicating at the panel the number of a load circuit selected for operation and for indicating the number of a tripped circuit breaker.

Another object is to provide such a remotely controlled circuit breaker system also including a supervisory panel which indicates whether each circuit breaker is in an on, off or tripped (fault) condition.

A further object of the invention is to provide a multiplexed remotely controlled load protection and switching system.

A more specific object of the invention is to provide a frequency multiplexed remotely controlled circuit breaker system having a novel logic circuit for producing various control and supervisory functions.

Briefly, the foregoing objects are accomplished in a preferred embodiment of the invention in the following manner. Each load circuit is assigned a number. A push button tone selector is located in the pilot's cabin. To energize a load, the load number is selected on the push buttons. An operate push button is then depressed to activate logic circuits which generate a tone signal unique to the selected load. This signal is sent to a remote part of the aircraft where it is decoded to close the power switch between a power supply and the selected load circuit. When the load is energized, another unique tone signal is fed back through decoding circuits to a supervisory panel to indicate that the selected load is energized. A load may be de-energized by the same procedure, and a corresponding indication appears on the supervisory panel. When a fault occurs, the load switch is opened by its circuit protector, and a fault indication for that load appears on the supervisory panel.

The push button selector also includes a digital lamp display of the number of a selected load circuit. If a load with a fault on it is selected, a red background lamp illuminates the display when the operate button is depressed. An interrogate button on the tone selector permits a selected load to be interrogated as to its condition. If its power switch has been tripped due to a fault, a trip lamp on the selector panel is energized. If the load is "on," a green "set" lamp is energized.

The selector panel also includes a warning lamp. A physical condition in the aircraft may be monitored by a transducer which is assigned a number. This transducer may also be interrogated by the tone selector. If an abnormal condition exists, a "warning" lamp on the selector panel is energized.

The tone signals and other control signals used in the logic and control networks are of very low power and require only very small gauge wire. The only power conductors required are those connecting the power supply to the loads through the power switches.

The foregoing and other objects, features and advantages of the invention will be apparent from the following more particular description of a preferred embodiment of the invention as illustrated in the accompanying drawings.

FIG. 4 is a schematic block diagram of the preferred embodiment of the improved remotely controlled circuit breaker system.

Figure 1:
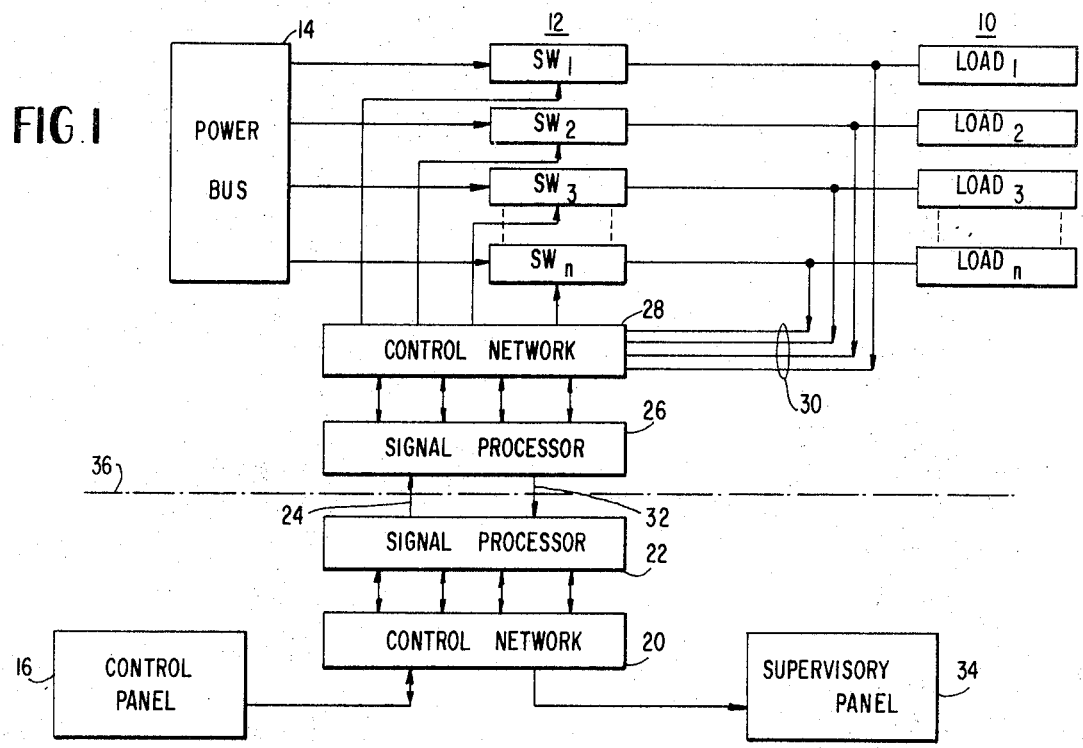
FIG. 1 is a functional block diagram of the improved circuit breaker system of the invention.
Figure 2:
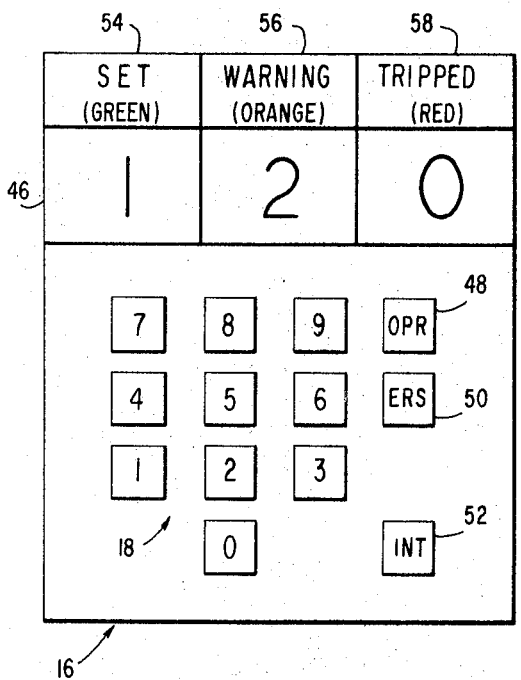
FIG. 2 is a schematic drawing of the control panel.
Figure 3:
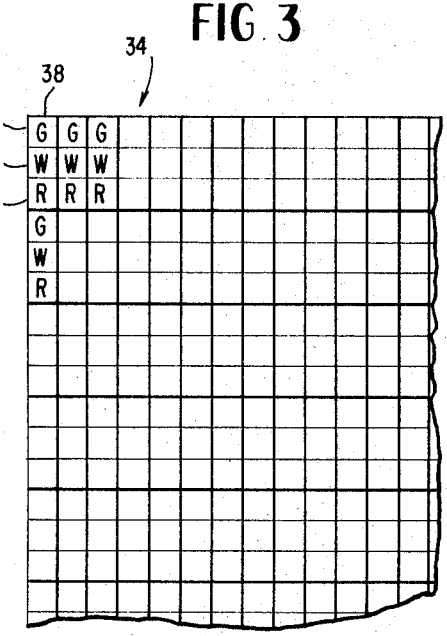
FIG. 3 is a schematic drawing of a portion of the supervisory panel.

Let us now look at FIGS. 1, 2 and 3. We will consider an aircraft having one thousand load circuits 10 which are connected through corresponding load power controlling means, illustrated as switches 12, to a power bus 14.

Initially, we will assume that all power switches 12 are open, and we now desire to set or turn on a load circuit whose assigned number is 120.

The control panel 16 contains ten push buttons 18 corresponding to the digits 0, 1, 2 . . . 8, 9. To select load circuit 120, the push buttons corresponding to digits 1, 2 and 0 are depressed to close corresponding switches in the control panel which in turn energize circuits in a control network 20 which produces electrical signals which are fed to a signal processor 22 which generates, for example, a unique tone or frequency signal corresponding to the selected circuit number 120.

This tone signal is fed via a single conductor 24 to a signal processor 26 located in the vehicle remotely from the pilot's cabin. Processor 26 decodes the tone signal and feeds it through another control network 28 which closes the switch 12 correspondingly to the selected load number 120. Consequently, load 120 is connected to the power bus 14. Switches 12 are used both to perform the power or on-off switching and also the protecting or interrupting function for the loads. When one of the loads 10 is energized by the closing of a corresponding switch 12, a signal is fed back via one of the conductors 30 through the same components and a single conductor 32 to the supervisory panel 34 located in the pilot's cabin. The components located below the dashed line 36 are located in the pilot's cabin while the components located above line 36 are located remotely from the cabin elsewhere in the aircraft.

Supervisory panel 34 contains typically one thousand sets of three indicator lamps each. Let us assume that set 38 corresponds to load circuit 120. When load 120 is turned on, a green lamp 40 is energized. When the load circuit is off, a white lamp 42 is energized. When a load fault has caused its corresponding switch 12 to trip to interrupt the load, a red lamp 44 is energized. When a switch 12 is tripped open because of a fault, a signal is fed back via conductors 30 to the supervisory panel to energize the corresponding red lamp.

When number 120 is punched in the control panel by means of the push buttons 18, the number of the selected circuit appears on the digital lamp display 46. If the displayed number corresponds to the desired number, operate button 48 must be depressed in order to energize the corresponding switch 12. If the displayed number is incorrect, the selecting circuits may be cleared by pushing the erase button 50 which also clears the digital display. The correct number may then be repunched.

If an overload or other fault condition should occur in load 120, for example, the corresponding power switch 12 will automatically be tripped by an integral fault sensing means to interrupt the load. A fault signal will then be fed back through the components illustrated in FIG. 1 to the supervisory panel 34. The green lamp 40 will be de-energized and the red lamp 44 will be illuminated. Simultaneously, the number of the circuit will appear on the digital display 46 with a red background light to indicate trouble on load circuit 120. To correct the fault, the operate button 48 is depressed to send a reset signal to the corresponding power switch 12. If the fault or overload has been removed, power switch 12 will reset. If the fault remains, the circuit number will remain displayed on control panel 16 when the operate button is released. Normally, the display is erased by release of the operate button.

If it is desired to turn off circuit 120 when it is already on, the circuit number is punched in the control panel and the operate button is depressed. As is explained in more detail below, the control network contains various bistable circuits or flip-flops which are reset at the time the operate button is released after turning on the circuit; therefore, the operate button can later be used to turn off the selected load circuit.

If it is desired to interrogate at the control panel the condition of a particular load circuit, the load circuit number is punched in on the push buttons 18, and then an interrogate button 52 is depressed. The control panel 16 also includes a green SET lamp 54, an orange WARNING lamp 56 and a red TRIPPED lamp 58. If the circuit is set on, lamp 54 will be energized. If the circuit has been tripped due to a fault, lamp 58 will be energized. It is also possible to have some of the 1000 numbers assigned to monitor a condition, such as temperature, pressure, etc., rather than a load circuit. If such a condition is interrogated and is abnormal, warning lamp 56 will be energized.

FIG. 4 is a logical block diagram illustrating the details of a preferred embodiment of a multiplexed remotely controlled circuit switching and protection system. Again, we will assume that we are to select a load 120 which has been assigned the code number 120. The push buttons 18 corresponding to the digits 1, 2 and 0 are depressed in that sequence. These push buttons operate pairs of switches 60. Depressing a push button will close one pair of switches and also a common switch 62, all of which are connected to a conductor 64 which is connected to a control power supply V+.

Push button "1" is first depressed to close switches 66, 68 and the common switch 62. Each pair of switches is connected to the two inputs of a corresponding one of a set of ten AND gates 70, which decode the output of the conventional telephone touch tone selector. When switches 66 and 68 are closed, AND gate 72 produces an output which conditions the upper input of the "1" AND gate 74 in a group of ten "hundreds" AND gates 76. The upper inputs of the "1" AND gates in the group of ten "tens" AND gates 77 and ten "units" AND gates 79 are also energized. However, only AND gate 74 also has its lower input energized, because flip-flops 78 and 80 have both been switched to their "0" or reset conditions by the closing of switch 62.

Flip-flops 78 and 80 form a two-stage binary counter. Since both reset outputs are connected to the inputs of a "hundreds" AND gate 82, the output of the AND gate is energized and enables the lower input of all the "hundreds" AND gates 76. However, only AND gate 74 has both inputs conditioned, and its output then sets flip-flop 84 which is one of ten "hundreds" flip-flops 86. The output of flip-flop 84 also energizes the "1" lamp 88 in the "hundreds" position digital display 46. The set output of flip-flop 84 conditions the upper input of one hundred gates of a set of one thousand AND gates 90. These one hundred gates correspond to load numbers 100 to 199.

Furthermore, when push button "1" is released, the common switch 62 is opened, thereby triggering flip-flop 78 back to its set or "1" condition. Consequently, when the digit "2" is punched in, the output of an AND gate 92 conditions the upper input of AND gate 94 in set 76, the upper input of AND gate 96 in set 77 and the upper input of AND gate 98 in set 79. However, only the AND gate 96 is enabled since only its lower input is energized by the output of a "tens" AND gate 100, one of whose inputs is connected to the set output of flip-flop 78 and the other to the reset output of flip-flop 80.

Therefore only flip-flop 102 in the "tens" group of flip-flops 104 is set to energize the middle input of all the AND gates 90 which correspond to a number having a "2" in the tens position. The output of flip-flop 102 energizes the "2" lamp 107 in the tens position of digital display 46. When the "2" push button is released, common switch 62 is again opened to reset flip-flop 78 and set flip-flop 80 so that when the third digit "0" is punched on the control panel, the output of AND gate 106 is energized to condition the "0" AND gates in gate groups 76, 77 and 79. However, only AND gate 108 in the units group 79 will be enabled, because only it has its second input conditioned. AND gate 108 is enabled by the output of a "units" AND gate 110 whose two inputs are connected to the reset output of flip-flop 78 and to set output of flip-flop 80. Consequently, only the "units" indicator flip-flop 112 is set to energize the lower input of all the AND gates 90 which correspond to the assigned load number whose units digit is "0." The output of flip-flop 112 also energizes the "0" lamp 115. Release of the "0" push button again opens switch 62 to return both flip-flops 78 and 80 to their reset positions.

It can be seen that the flip-flop 78 and flip-flop 80 function to select in sequence the hundreds, tens and units inputs of the push buttons 18 on the control panel 16.

When operate button 48 is depressed, only AND gate 114 in the set 90 will have all four of its inputs energized for any three digit input from the push buttons on the control panel. This AND gate corresponds to the number 120. The output from AND gate 114 keys "on" an oscillator 116, which is one of a group of one thousand oscillators 117, each of which generates a different frequency tone. The unique tone from the selected oscillator 116 is fed through an amplifier 118 and a driver 121 via a single conductor 122 to the remote part of the aircraft. Amplifier 118 and driver 121 are common to the outputs of all of the oscillators 117.

The conductor 122 is connected to a decoding network in the vehicle. The network consists of one thousand frequency discriminators 124 each corresponding to a different one of the one thousand unique tones. Discriminators 124 may be band pass filters; for example, band pass filter 126 passes the unique tone corresponding to load circuit 120. The outputs of the frequency discriminators 124 are connected to the inputs of corresponding flip-flops 128. In this case, flip-flop 130 is set to energize conductor 132. The signal on conductor 132 sets a circuit protector 136 which includes a switch corresponding to the one of the power switches 12 illustrated in FIG. 1. When the circuit protector 136 is set, power is applied from power bus 138 through protector 136 and conductor 140 to the load 120. The set pulse from flip-flop 130 is also applied via a lead 142 to the upper input of an OR gate 144. If there is no fault present on load 120, a fault flip-flop 146 is in its "0" or reset condition, thereby conditioning the input 148 of an AND gate 150. Consequently, the output of OR gate 144 will be applied to capacitor 152 to produce a pulse 154 which triggers "on" a monostable circuit 156 whose output pulse 158 is applied to the input 160 of an AND gate 162 and also to the input 164 of an AND gate 166. The pulse 154 is also coupled to a flip-flop 168 to place it in a set condition to energize the other input 170 of AND gate 166. The output of AND gate 166 then keys "on" an indicator oscillator 172. Oscillator 172 generates a frequency different from the frequency generated by oscillator 118, but unique to load circuit 120. There is an indicator oscillator corresponding to each of the one thousand loads. The outputs of all such oscillators, including oscillator 172 are connected in common to a conductor 174 so that the output of oscillator 172 is fed through an amplifier 176, a driver 178 and a single conductor 179 to a decoder 180 in the pilot's cabin. Decoder 180 consists of one thousand pairs of frequency discriminators or pass filters. Pass filters 182 and 184 correspond to load 120. Filter 182 passes the output of indicator oscillator 172. Driver 178 and amplifier 176 are common to all of the indicator oscillators.

The output of decoder 182 switches an indicator flip-flop 186 from its reset (0) to its set (1) position to energize the green ON or OK lamp 40 on supervisory panel 34. Switching flip-flop 186 from its reset to set position also de-energizes the white OFF lamp 42 on the supervisory panel and resets fault flip-flop 196 via lead 187. When operate button 48 is now released to its upper position, a capacitor 190 generates on conductor 191 a pulse 192 which is applied to the reset terminals of the flip-flops in groups 86, 104 and 105, so that they are all cleared or returned to their reset position so that all of the digital display lamps in the digital display 46 are cleared or erased.

To turn off a load circuit which is ON or energized, the number of the circuit is punched and by depressing the push buttons on the control panel and the same action takes place through the flip-flops 86, 104 and 105, oscillators 117, amplifier 118, driver 30 and the frequency discriminators 124. However, now the output of filter 126 returns flip-flop 130 to its OFF or reset state, thereby resetting circuit protector 136 and opening the power switch between load 120 and power bus 138. The resulting reset or negative signal on lead 140 on the output of circuit protector 136 is converted to a positive or set pulse by means of the inverter 194. This set pulse is fed through OR gate 144, AND gate 150 and a capacitor 152 to produce a pulse 158. Since flip-flop 168 is also set by pulse 154, both inputs of AND gate 166 are enabled. Note that when monostable circuit 156 times out each time, it automatically resets flip-flop 168 via a line 157.

The output of AND gate 166 again energizes indicator oscillator 172 whose output is fed through amplifier 176 and driver 178 to filter decoder 182 whose output returns the indicator flip-flop 186 to its reset or "0" condition, thereby energizing the lower input of an AND gate 195 whose output is connected to the white OFF lamp 42. Since a fault flip-flop 196 is in its reset condition, the upper input of AND gate 196 is also conditioned, thereby energizing lamp 42.

Let us now assume that load circuit 120 is energized and a fault occurs. The circuit protector 136 senses the fault and produces a trip signal on lead 197, to enable the upper input of an AND gate 198. The lower input of AND gate 198 is enabled by the set pulse on lead 132 at the output of flip-flop 130. Consequently, the output of AND gate 198 is energized to set fault flip-flop 146, thereby resetting flip-flop 130 by means of the pulse fed along lead 199. The set output of flip-flop 146 also enables the upper input of AND gate 162 and applies a trigger pulse to the input of monostable circuit 156 to once again produce the pulse 158. Consequently, both inputs of AND gate 162 are enabled to produce an output which keys "on" fault oscillator 200.

Fault oscillator 200 generates a tone signal whose frequency is different from all the other frequencies generated in the system but unique to load circuit 120. There are one thousand fault oscillators in the system, each with a different frequency. The output of fault oscillator 200 is fed through the common amplifier 176 and driver 178 and through a filter 184 which is designed to pass the output frequency of fault oscillator 200. The output of filter 184 switches flip-flop 196 from its reset or "0" state to its set or "1" state, thereby energizing the red fault or trip lamp 44 on the supervisory panel. Fault flip-flop 196 also resets indicator flip-flop 186 via the lead 206, thereby de-energizing the OK lamp 40. Furthermore, AND gate 195 is disabled because its upper input is connected to the reset output of fault flip-flop 196. Consequently, OFF lamp 42 cannot be energized.

Connected to the set output of fault flip-flop 196 are three diodes 208, 210 and 212. Diode 208 is connected to the set input of indicator flip-flop 112, diode 210 is connected to the set input of indicator flip-flop 102, and diode 212 is connected to the set input of flip-flop 84. Therefore, these three flip-flops corresponding to the load 120 energize their respective lamps in the digital display on control panel 16 to present the number 120 on the display. A capacitor 214 is also connected to the set output of fault flip-flop 196 and produces a pulse 216 which is fed through an OR gate 218 to set a flip-flop 220 whose output energizes a red lamp 222 which provides a red background light for the digital display.

To attempt to clear a fault, the operate button 48 is depressed. Flip-flop 130 will again be set as previously described, but if a sustained fault is present, a trip signal will immediately appear on lead 197 to maintain the circuits in the fault condition. However, if the fault has been removed, the circuit will proceed to function in the same way as described previously in connection with originally setting or turning on the load circuit. That is, when the fault has been successfully cleared, the load 120 is completed through the circuit protector 136 to reset the fault flip-flop 146. Fault flip-flop 192 will also be reset thereby resetting the indicator flip-flops 84, 102 and 112. When operate button 48 is released, capacitor 190 causes the pulse 192 to be applied to the reset inputs of all the indicator flip-flops, thereby erasing the display by de-energizing the display lamps.

The rest output of flip-flop 196 is connected through an OR gate 223 to the reset terminal of flip-flop 220 in order to reset flip-flop 220 and turn off the red background lamp 222 when fault flip-flop 196 is reset. The reset output of the fault flip-flops from all the other channels are also connected through OR gate 223 to reset flip-flop 220.

In order to perform the interrogating function, the outputs of the set 90 of AND gates are connected to the upper inputs of a corresponding set 226 of AND gates. Specifically, the AND gate 114 corresponding to load circuit 120 is connected to the upper input of AND gate 228 which also corresponds to load 120. Thus, when the interrogate button 52 is depressed, the output of AND gate 228 conditions the lower inputs of another pair of AND gates 230 and 232. The upper input of AND gate 230 is connected to the output of indicator flip-flop 186, and the upper input of AND gate 232 is connected to the output of fault flip-flop 196. The output of AND gate 230 is connected through a driver 234 to the green SET lamp 54 on the top of control panel 16. Consequently, when indicator flip-flop 186 is set, the set lamp 54 is energized. In like manner, the output of AND gate 232 is connected through a driver 236 to the red fault or "tripped" lamp 100 on the top of control panel 16. Therefore, when fault flip-flop 196 is set, the red lamp 58 is energized. When interrogate button 52 is released to its upper position, a pulse is produced by capacitor 238 to reset the flip-flops 86, 104, 105, 78 and 80 as previously described.

It may also be desirable to monitor and receive warning indications from conditions other than load circuits. For example, an AND gate 240 in the set 90 of AND gates may be assigned to monitor the temperature of a bearing. Let us assume that this AND gate is assigned the number 899. This number is punched in at the control panel and the upper input of AND gate 242 is conditioned. AND gate 242 is in the set 226 of AND gates. The other input of AND gate 242 is connected to the interrogate button 52. A heat transducer 244 adjacent the bearing produces a signal which is applied through an amplifier 246 and a threshold detector 248 which is connected to a reference voltage 250. When the output of amplifier 246 exceeds the reference, the output of the detector conditions the upper input of an AND gate 252. When interrogate button 52 is depressed, the output of AND gate 242 enables the lower input of AND gate 252 whose output is then fed through a driver 254 to energize the orange warning lamp 56 on the top of the control panel 16. The output of detector 248 may also be connected to a flip-flop, such as fault flip-flop 146 (FIG. 4B), so as to create a fault signal at the control panel as previously described.

Any other type of frequency multiplexing or time division multiplexing could be used to achieve the same results. Furthermore, a binary coded wiring scheme, whereby each load is controlled by a unique input binary code, could also be employed. Such a binary system would require greater than the two conductors used in the described frequency division system. However, the 1000 channels given as an example herein would only require $n=10$ wires per function as $2^n-1$ equals 1023 unique combinations are available with 10 conductors. As three functions are required (set-reset, energized, and tripped) for each load, a total of 30 conductors would handle the 1000 loads.

What is claimed is:

1. In a supervisory and control system for a plurality of electrical loads including power controlling means for controlling the application of power to the loads from a power source means, the improvement comprising:
    (a) a control panel,
    (b) display means at said control panel for displaying a numerical identification of each of said loads,
    (c) means coupled to said loads for producing for each load status signals each of which indicates a different one of a plurality of possible conditions of each load,
    (d) selector means at said panel for selecting each one of said loads,
    (e) said display means being responsive to said selector means to display the numerical identification of a selected load,
    (f) a supervisory panel,
    (g) individual indicating means at said supervisory panel and responsive to said status signals for simultaneously and continuously indicating the conditions of all said loads, and
    (h) alarm means associated with said display means and responsive to a fault status signal for indicating that the load whose numerical identification is displayed is in a fault condition.

2. A supervisory and control system as defined in claim 1 further comprising:
    (a) erase means at said control panel operative to erase from said display means the numerical identification of a selected load, and
    (b) operate means at said control panel and associated with said selector means, said operate means being operative to control the selected load if said erase means is not operated.

3. A supervisory and control system as defined in claim 1 further comprising:
    (a) interrogate means at said control panel operative to interrogate the status of a selected load, and
    (b) additional indicating means at said control panel and responsive to a status signal for indicating the condition of a selected load which has been interrogated by the operation of said interrogate means.

References Cited

UNITED STATES PATENTS

| | | |
|---|---|---|
| 2,664,544 | 12/1953 | Doremus et al. |
| 2,679,640 | 5/1954 | Dondero et al. _____ 340—226 |
| 3,256,517 | 6/1966 | Saltzberg et al. __ 340—408 XR |
| 3,349,374 | 10/1967 | Gabrielson et al. ____ 340—163 |

DONALD J. YUSKO, Primary Examiner

U.S. Cl. X.R.

340—408